(12) United States Patent
Parthasarathi et al.

(10) Patent No.: US 11,789,712 B2
(45) Date of Patent: Oct. 17, 2023

(54) DATA CONFIGURATION DEPLOYMENT FRAMEWORK

(71) Applicant: JPMorgan Chase Bank, N.A., New York, NY (US)

(72) Inventors: Dinesh B. Parthasarathi, Bournemouth (GB); Shankar Raju, Erode (IN); Vigneshwaran Vijayakumar, Whitefield (IN)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 17/467,399

(22) Filed: Sep. 6, 2021

(65) Prior Publication Data
US 2023/0076276 A1  Mar. 9, 2023

(51) Int. Cl.
*G06F 8/60* (2018.01)
*G06F 9/445* (2018.01)

(52) U.S. Cl.
CPC .......... *G06F 8/60* (2013.01); *G06F 9/44505* (2013.01)

(58) Field of Classification Search
CPC .............................. G06F 8/60; G06F 9/44505
See application file for complete search history.

(56) References Cited

U.S. PATENT DOCUMENTS

| | | | | |
|---|---|---|---|---|
| 7,861,223 B1 * | 12/2010 | Schmidt | ............. | G06F 9/44505 717/121 |
| 8,185,873 B2 * | 5/2012 | Pullara | ............. | G06F 8/61 717/121 |
| 8,707,292 B2 * | 4/2014 | Little | ............. | G06F 8/61 717/172 |
| 10,216,508 B1 * | 2/2019 | Vartha | ............. | G06F 8/64 |
| 10,430,204 B2 * | 10/2019 | Reeves | ............. | G06F 9/445 |
| 11,126,671 B2 * | 9/2021 | Miller | ............. | G06F 3/04842 |
| 11,150,883 B2 * | 10/2021 | Kripalani | ............. | G06F 8/61 |

(Continued)

FOREIGN PATENT DOCUMENTS

| | | | | |
|---|---|---|---|---|
| CN | 103064356 B | * | 4/2016 | ............. G05B 19/04 |
| CN | 109460251 A | * | 3/2019 | ............. G06F 8/71 |

(Continued)

OTHER PUBLICATIONS

Mahimkar et al., "Auric: Using Data-driven Recommendation to Automatically Generate Cellular Configuration", 2021, ACM (Year: 2021).*

(Continued)

*Primary Examiner* — Wei Y Zhen
*Assistant Examiner* — Junchun Wu
(74) *Attorney, Agent, or Firm* — Nwamu, P.C.

(57) ABSTRACT

Implementations generally relate to a data configuration deployment framework. In some implementations, a method includes extracting configuration information and deployment information from a database. The method further includes storing the configuration information and the deployment information in a file having a predetermined computer-readable format. The method further includes generating a configuration package based on the configuration information and the deployment information, wherein the configuration package includes the configuration information and the deployment information. The method further includes deploying the configuration package.

11 Claims, 10 Drawing Sheets

(56) References Cited

U.S. PATENT DOCUMENTS

| | | | | |
|---|---|---|---|---|
| 11,368,539 | B1* | 6/2022 | Chen | H04L 41/0806 |
| 11,398,949 | B2* | 7/2022 | Hall | H04L 41/0859 |
| 2004/0268298 | A1* | 12/2004 | Miller | G06F 8/60 |
| | | | | 717/106 |
| 2006/0047798 | A1* | 3/2006 | Feinleib | G06F 8/61 |
| | | | | 709/223 |
| 2008/0092136 | A1* | 4/2008 | Pullara | G06F 8/61 |
| | | | | 717/174 |
| 2009/0133014 | A1* | 5/2009 | Laurila | G06F 8/60 |
| | | | | 717/174 |
| 2010/0023738 | A1* | 1/2010 | Sheehan | G06F 9/44505 |
| | | | | 713/1 |
| 2011/0225579 | A1* | 9/2011 | Khandelwal | G06F 8/60 |
| | | | | 717/177 |
| 2014/0047228 | A1* | 2/2014 | Attar | G06F 9/44505 |
| | | | | 713/2 |
| 2017/0139725 | A1* | 5/2017 | Koufogiannakis | |
| | | | | G06F 9/44505 |
| 2017/0139734 | A1* | 5/2017 | Cropper | G06F 9/45558 |
| 2017/0277524 | A1* | 9/2017 | Bhat | G06F 8/60 |
| 2017/0286261 | A1* | 10/2017 | Li | G06F 9/44505 |
| 2018/0095739 | A1* | 4/2018 | Baset | G06F 8/71 |
| 2018/0217824 | A1* | 8/2018 | Kasthuri | G06F 8/41 |
| 2019/0042320 | A1* | 2/2019 | Prince | G06F 9/5077 |
| 2022/0066746 | A1* | 3/2022 | Gafni | G06Q 20/02 |
| 2022/0094593 | A1* | 3/2022 | Karikallio | H04L 41/0869 |
| 2022/0188373 | A1* | 6/2022 | Fujiu | G06F 16/9577 |
| 2022/0222048 | A1* | 7/2022 | Yin | G06F 9/44505 |

FOREIGN PATENT DOCUMENTS

| | | | | | |
|---|---|---|---|---|---|
| CN | 107038042 | B | * | 8/2020 | G06F 9/44505 |
| CN | 112099878 | A | * | 12/2020 | |
| CN | 112346818 | A | * | 2/2021 | |
| CN | 112835591 | A | * | 5/2021 | |
| CN | 113656088 | A | * | 11/2021 | |
| CN | 114942754 | A | * | 8/2022 | |
| WO | WO-2021174756 | A1 | * | 9/2021 | G06F 8/60 |

OTHER PUBLICATIONS

Dong et al., "BlueSky Cloud Framework: An E-Learning Framework Embracing Cloud Computing", 2009, Springer-Verlag Berlin Heidelberg (Year: 2009).*

Aalst, "Business Process Management: A Comprehensive Survey", 2013, Hindawi Publishing Corporation (Year: 2013).*

Greenfield et al., "Software Factories Assembling Applications with Patterns, Models, Frameworks and Tools", Oct. 2003, ACM (Year: 2003).*

* cited by examiner

300

500

600

| CaC 1 for ENQUIRY>JPMC. CUSTOMER DETAILS | CaC 2 for HELPTEXT.MENU> CUST.DETS | CaC 3 for HELPTEXT.MAINMENU>78 |
|---|---|---|
| Name - F.ENQUIRY! JPMC.CUSTOMER DETAILS!SA0010001.cac | Name - F.HELPTEXT.MENU! CUST. DETS!SA0010001.cac | Name - F.HELPTEXT.MAINMENU!78! SA0010001.cac |
| 4,99<br>CUSTOMER<br><br><br><br><br>CUSTOMER.NO]SHORT.NAME ]DESC<br>CUSTOMER.NO]SHORT.NAME<br>1]2<br>10R]35L<br>]<br>]<br>L]L<br>]<br>Customer Number]Customer Name<br>]<br>2 1]2<br>0<br>0<br>0<br>0<br>3<br>5033_SHANKAR.<br>1_1_INAU_OFS_TCS<br>2105190409]2105190409<br>5033_SHANKAR.1_OFS_TCS<br>SA2730001<br>1 | ENQ CUSTOMER.DETAILS<br>Customer Details<br><br>1<br>4123_SHANKAR.2_1_INAU<br>2105190425]2105190425<br>4123_SHANKAR.2<br>SA2730001<br>1 | Branch Enquiry<br>JPMC.CUST.DETS<br><br>2<br>4123_SHANKAR.2_1_INAU<br>2105190423]2105190431<br>4123_SHANKAR.2<br>SA2730001<br>1 |

DaC for this example

Name - R221.01.CustomerDetails.dac

ENQUIRY>CUSTOMER.DETAILS

HELPTEXT.MENU>CUST.DETS

HELPTEXT.MAINMENU>78

Name - R221_DataConfigs.v1.zip

F.ENQUIRY!CUSTOMER.DETAILS!SA0010001.cac

F.HELPTEXT.MENU!CUST.DETS!SA0010001.cac

F.HELPTEXT.MAINMENU!78!SA0010001.cac

R221.01.CustomerDetails.dac

DATA CONFIGURATION DEPLOYMENT FRAMEWORK

BACKGROUND

Financial technology (Fintech) is an emerging industry that uses technology to improve activities in finance. For example, Fintech enables financial services to be more accessible to the general public with the use of mobile devices such as smartphones for mobile banking, investing, borrowing services, cryptocurrency, etc.

BRIEF DESCRIPTION OF THE DRAWINGS

FIG. 7 is an example configuration as code, according to some implementations.

FIG. 8 is an example deployment as code, according to some implementations.

FIG. 9 is an example configuration package, according to some implementations.

DETAILED DESCRIPTION

Fintech technology may be used to improve or augment financial activities, as indicated above. Providing financial information to internal and external customers of a financial institution may involve development of user interfaces and associated configurations and functions. Such development typically involves a developer manually handling configurations, which is time consuming and tedious due to numerous changes to configurations that are not readable and not traceable, making packaging and deployment of information challenging.

As such, implementations described herein provide a data configuration deployment framework. Implementations may be applied to various banking software products. Such products may include highly configurable systems, where, for example, user interface screens and associated functional requirements are developed by configurations and/or configuration plus code (e.g., Jbase code, etc.). Various implementations described herein may be applied at the database layer of deployment and other layers, and may involve functional changes, screen design changes, and changes to related files and system property files. In this manner, implementations provide continuous deployment and effective pipelines. Implementations store configuration packages in an accessible repository or repositories in a form that achieves readability and traceability, as well as visibility of changes in configurations for review. Implementations also provide common versioning for code together with data and configuration components.

As described in more detail herein, in various implementations, a system receives configuration information and deployment information from a database, and then stores the configuration information and the deployment information in a file having a predetermined computer-readable format. The system then generates a configuration package based on the configuration information and the deployment information, where the configuration package includes the configuration information and the deployment information. The system then deploys the configuration package. Implementations eliminate or minimize long, tedious, and manual processes associated with packaging and promoting configurations for deployment.

Figure 1:
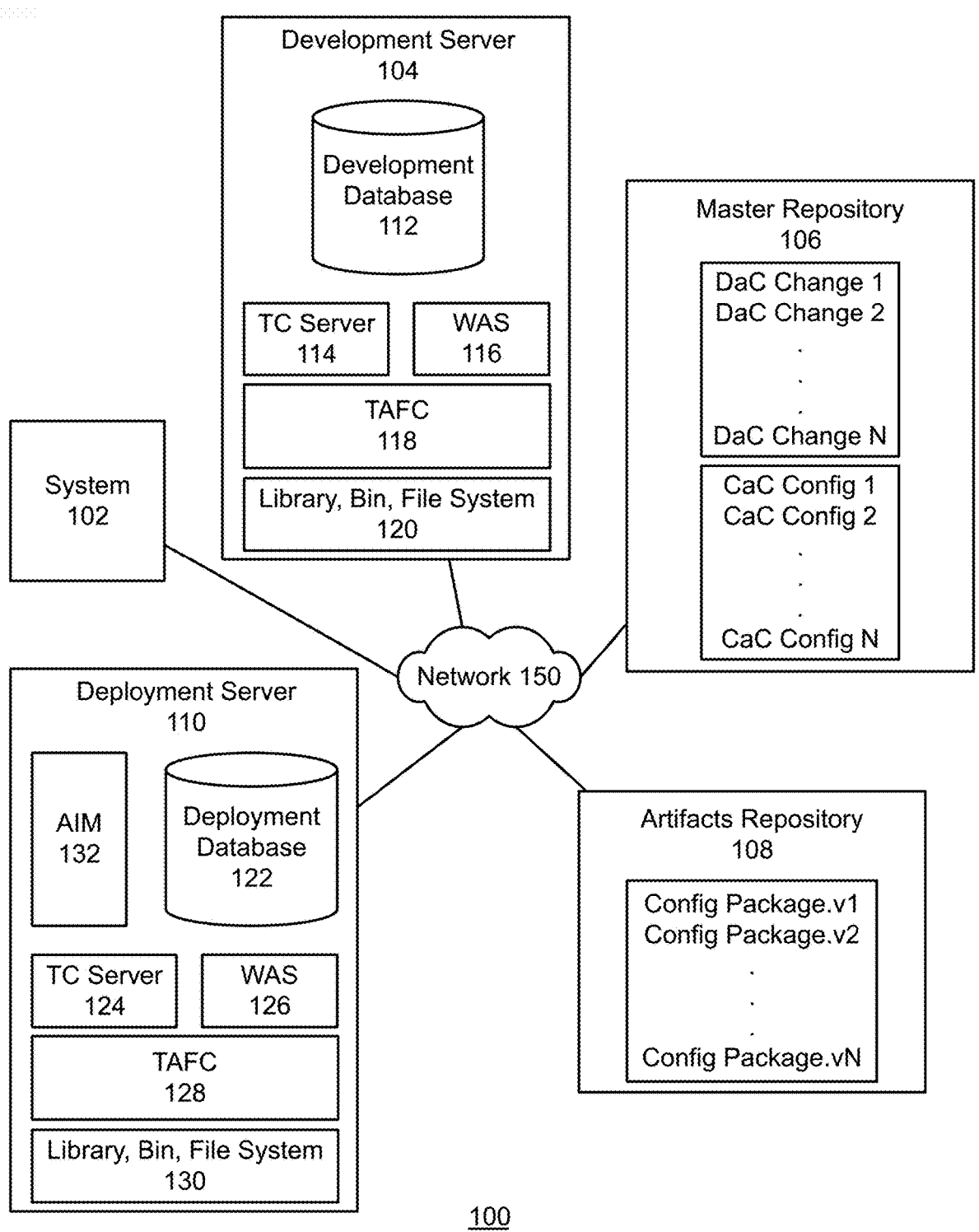
FIG. 1 is a block diagram of an example environment for providing a data configuration deployment framework, which may be used for implementations described herein.

FIG. 1 is a block diagram of an example environment 100 for providing a data configuration deployment framework, which may be used for implementations described herein. As shown, environment 100 includes a system 102, a development server 104, a master repository 106, an artifacts repository 108, a deployment server 110, and a network 150. Development server 104 and deployment server 110 may communicate with system 102 and/or may communicate with each other directly or via system 102 via network 150. Network 150 may be any suitable communication network such as a Wi-Fi network, Bluetooth network, the Internet, etc.

Development server 104 includes a development database 112 and a Temenos Connect (TC) server 114. Development server 104 may also include a websphere application server (WAS) 116, a Temenos application framework C (TAFC) 118, and a library, bin, file system 102. In various implementations, development database 112 stores data associated with the application and associated with other implementations described herein. TC server 114 is a component that enables the setting up of adapters and listeners in order to establish connectivity with the application server (e.g., an application server in connection with system 102). In some implementations, other suitable servers may be used in lieu of TC server 114, depending on the particular implementation. WAS 116 is a websphere instance that hosts the application for user interface and Java EE components. TAFC 118 is runtime component that manages the execution of code, connectivity, data formatting, etc. In some implementations, other suitable frameworks may be used in lieu of TAFC 118, depending on the particular implementation. Library, Bin, File System 120 are various components that contain business logic and supporting files.

Master repository 106 includes deployment as code (DaC) changes. As shown, DaC changes may include DaC Change 1 through DaC Change N, and may include configuration as code (CaC) configurations CaC Configuration 1 through CaC configuration N. Artifacts repository 108 includes configuration packages configuration package.v1 through configuration package.vN.

Deployment server 110 includes a deployment database 122 and a TC server 124. Deployment server 110 may also include a WAS 126, a TAFC 128, and a library, bin, file system 130, and an app infra mode (AIM) 132. In various implementations, AIM 132 is a deployment automation and configuration management tool that enables fast, safe, and repeatable deployments to multiple technology platforms.

For ease of illustration, FIG. 1 shows one block for each of system 102, development server 104, master repository 106, artifacts repository 108, and deployment server 110. Blocks 102, 104, 106, 108, and 110 may each represent multiple respective systems, servers, and repositories. In other implementations, environment 100 may not have all of the components shown and/or may have other elements including other types of elements instead of, or in addition to, those shown herein.

While system 102 performs implementations described herein, in other implementations, any suitable component or combination of components associated with system 102 or any suitable processor or processors associated with system 102 may facilitate performing the implementations described herein.

Figure 2:
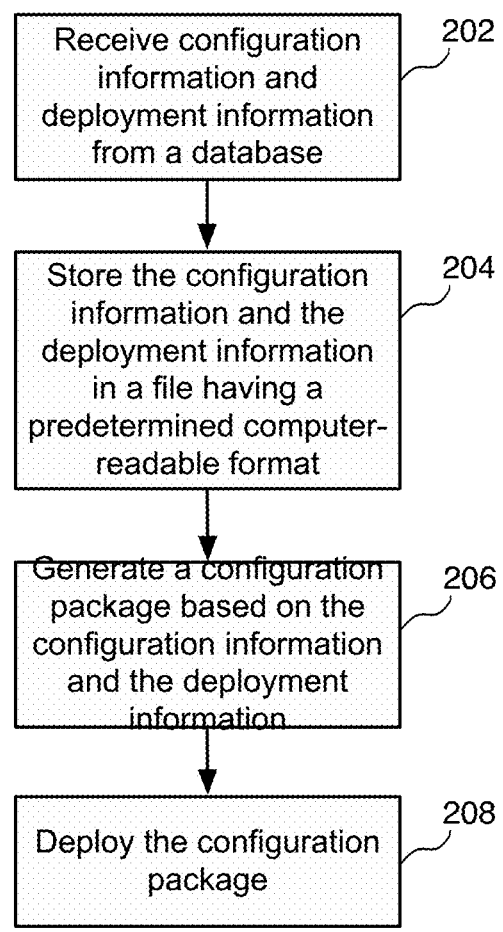
FIG. 2 is an example flow diagram for providing a data configuration deployment framework, according to some implementations.

FIG. 2 is an example flow diagram for providing a data configuration deployment framework, according to some implementations. Referring to both FIGS. 1 and 2, a method begins at block 202, where a system such as system 102 extracts configuration information and deployment information from a database. In various implementations, the system may receive the configuration information by passively receiving the configuration information and/or actively requesting or fetching the configuration information.

In various implementations, the configuration information in the database includes information associated with functionality changes, screen design changes, and system property changes. The configuration information is packaged as an archive. In some implementations, the system packages the configuration information using various suitable techniques. An example technique may include a packaging mechanism. In various implementations, the package may contain a copy of record as in the database named with a sequence number and additional files with deployment details (e.g., details for deployment utility).

In various implementations, the system extracts one or more configuration components from the configuration information. Configuration components may include functionality, user interface screen design, system properties, etc. Further examples of configuration components are described in more detail herein.

In some implementations, the system may use a suitable technique and/or utility to read a list of configuration components to extract from the database. The system then stores the one or more configuration components in a file.

At block 204, the system stores the configuration information and the deployment information in a file having a predetermined computer-readable format. In various implementations, the system may store the configuration information and the deployment information in a single file or in different files. The particular format of and data structure of the configuration as code (CaC) may vary and depend on the particular implementation. The following is an example CaC with the file name, "F.ENQUIRY!TEST!SA0010001."

4,99
CUSTOMER
CUSTOMER.NO
Customer number
@ID
@ID
1
10R

In this particular example implementation, 4,99 is associated with the page setup, where data is to be printed from row 4 with a maximum 99 rows per page. CUSTOMER is a table/T24 application from where the data to be queried. CUSTOMER.NO is a variable us to store the value during execution. Customer number is a label. The first instance of @ID is a column/field label. The second instance of @ID is an actual column/field label used to read the data. The number 1 is a counter. 10R is an alignment value to be applied on the display (e.g., 10R means 10 characters aligned right).

In various implementations, configuration as code (CaC) may refer to configuration(s) that are done on a database to get a result. For example, the system may extract the CaC in a readable format. As such, the system may store the CaC in a source code repository. In various implementations, the system may used the CaC to track changes and control by an approval processes. In various implementations, the CaC does not run independently, and is deployed on a target instance.

In various implementations, deployment as code (DaC) may refer to deployment instructions to deploy the code. The DaC may be stored in a file and stored in a specific format. The DaC may also be stored in the source code repository in order to track the changes and control by approval processes. Such deployment instructions may include the configurations to be deployed, and in what sequence. In various implementations, the DaC does not run independently, and is deployed in the deployment framework.

In various implementations, the system generates a unique name for the file that stores the configuration information. In some implementations, a unique name may have a semantic meaning such as "F.ENQUIRY!TEST!SA0010001" above. The complexity of the name may also be simple such as "Customer.Details," "Menu," "Main.Menu," "Application_Name!Record_Id!Company_Id". Such a unique name facilitates identification of a particular file for review or other processing of its contents. This achieves readability & traceability of configuration information. In various implementations, the file that stores the configuration information is computer-traceable. The system stores the CAC files in a suitable repository such as master repository 106 of FIG. 1. In some implementations, the system may receives source code from a repository. In various implementations, the source code may refer to code that is run by the application during runtime for any business logic related actions. In some implementations, the programming language of this source code may be JBASE, for example.

In various implementations, the deployment as code (DaC) includes the deployment instructions. These deployment instructions include a list of the configuration files to be built and deployed, and in what sequence. This enables control over the targeted build, deployment, and sequencing.

The particular format of and data structure of the deployment as code (DaC) may vary and depend on the particular implementation. The following is an example DaC with the file name, "R221.01.PAYMENTSINFO."

ENQUIRY>TEST1
VERSION>TEST2

As shown, the configuration files are "ENQUIRY" and "VERSION." For the deployment sequence, the ENQUIRY file is deployed first in a TEST 1 phase. The VERSION file is deployed second in a TEST 2 phase. The system stores the DAC files in a suitable repository such as master repository 106 of FIG. 1.

At block 206, the system generates a configuration package based on the configuration information and the deployment information. In various implementations, the configuration package includes the configuration information and the deployment information. In various implementations, the configuration package does not contain source code. The configuration package contains configuration as code and deployment as code. In various implementations, the configuration that is done in the database is extracted and saved as configuration as code. Also, the instruction to deploy the configurations in a specific format is called deployment as code, as indicated herein.

In various implementations, the system merges the CaC and DaC in master repository 106 or other suitable source code repository. Once the CaC and DaC are merged into a master branch of master repository 106, the system may then build or generate the configuration package. In some implementations, during the build process, the system first reads the DaC and builds a sub-package (of CaC & DaC) based on the details in the DaC. The system repeats this process for all of the DaCs. The system then builds and uploads for storage one cumulative package with all of the sub-packages to artifacts repository 108 for version control.

In various implementations, as indicated herein, the system stores the CaC and DaC in a source code repository. To create a configuration package, a build mechanism of the system reads the qualified DaC for a specific release, which may be one or many DaC files. The system then reads the content of the DaC, which may include a list of CaCs and additional messages. The build mechanism of the system creates sub packages with all of the CaCs per DaC file. Finally, the system groups all sub-packages into an archive and store the sub-packages in an artifacts repository.

In various implementations, the configuration package indicates one or more changes to the configuration information. For example, in some implementations, the configuration package indicates one or more functional changes. In some implementations, the configuration package indicates changes to screen design files. In some implementations, the configuration package indicates changes to system property files.

In various implementations, the system generates or builds the configuration package(s) to include supporting files that indicate the sequence of deployment for configuration components.

In various implementations, the system computes a deployment sequence based on the DaC. The system then adds the deployment sequence to the configuration package. In various implementations, as a given configuration package is completed for a particular change, the configuration package includes configuration components related to a specific requirement. This ensures that there is a relatively definite sequencing at the time of deployment. This is beneficial as there may be interdependent configurations. For Example, if a new screen is designed to show customer details, it will result in a set of CaCs (e.g., CaC1, CaC2 . . . CaCn) and a DaC with reference to the CaCs. At the time of the build, configuration package includes a subpackage containing the CaCs and DaC. At the time deployment, the DaC will be used and deployed based on the defined sequence 1, 2, . . . n.

Implementations of the configuration packages provide visibility of the changes in the configuration, thereby facilitating review of changes in the configuration. In some implementations, the file may have a particular data structure for easier readability and traceability. In some implementations, the file may be a compressed file (e.g., zip file, etc.) of the components to be packaged. For example, the file may be a delta package where the files change after the last release to production.

At block 208, the system deploys the configuration package. In various implementations, the configuration package may be one of multiple versions of the configuration package. This enables version control of the configuration packages. The system stores the different versions of the configuration packages in artifacts repository 108 and provides configuration options for different target deployment servers of different groups or organizations.

As a part of the deployment process, the system may utilize a suitable technique and/or utility to read the files from the configuration package for deployment. In some implementations, the system may further convert the file. For example, the system may put the file into an open financial service (OFS) to post, into a format for a build control (BCON) utility, etc.) as needed for deployment. The OFS is a standard module within the application. In various implementations, the OFS interactions with applications driven through the OFS. In various implementations, the OFS is message driven, and may work on a request-response based system. In various implementations, the BCON is an existing utility in the application for packaging. The BCON may provide various functionalities (e.g., saving programs, data libraries, local reference table definitions, standard selection descriptors, etc.) and may apply such functionalities in another environment (e.g., another T24 environment, etc.). The system may utilize a deployment orchestration tool (e.g., Jenkins, Bamboo, etc.) for selecting a target environment and version of package to deploy. In some implementations, the system may send instructions to AIM 132 of deployment server 110. This triggers deployment server 110 to download the appropriate configuration package from the artifacts repository to unpack. The system then reads the DaC files in the configuration package in a predetermined order based on the deployment sequence in the configuration package. The system then selects the appropriate CaC and deploys the configurations into deployment database 122. In various implementations, the system sends deployment results to a target group.

The following is an example use case illustrating an application of various implementations described herein. In this example, a developer designs a screen using configurations, tests it in a development instance, and prepares to promote the configurations to a test instance for testing.

Figure 3:
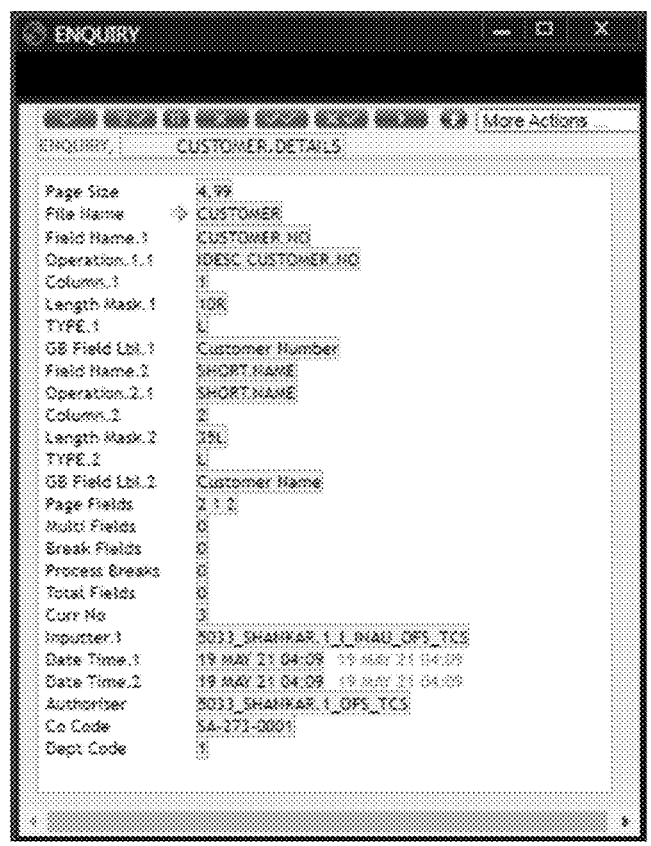
FIG. 3 is an example screenshot of a frontend user interface showing customer details, according to some implementations.

FIG. 3 is an example screenshot 300 of a frontend user interface (UI) showing customer details, according to some implementations. Shown is a developer-designed screen of a frontend UI that displays customer details. The customer details are arranged in a configuration table (labeled "ENQUIRY"), which holds the configurations to render a screen dynamically when invoked. In various implementations, a development team may create a configuration that will create a new screen to display all customers' names and customers' numbers.

Figure 4:
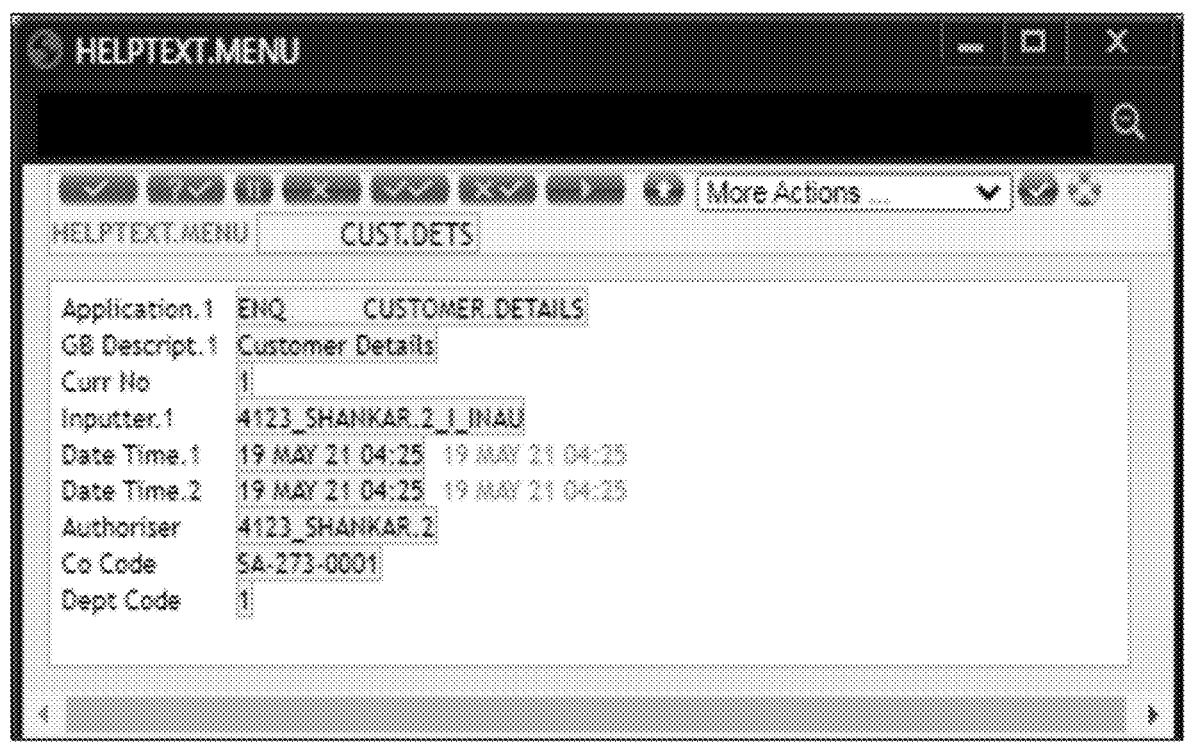
FIG. 4 is an example screenshot of configuration information associated with customer details, according to some implementations.

FIG. 4 is an example screenshot 400 of configuration information associated with customer details, according to some implementations. Shown is configuration information that causes the example screenshot of FIG. 3 to be linked to a "Branch Enquiry" menu, which is shown in FIG. 5.

Figure 5:
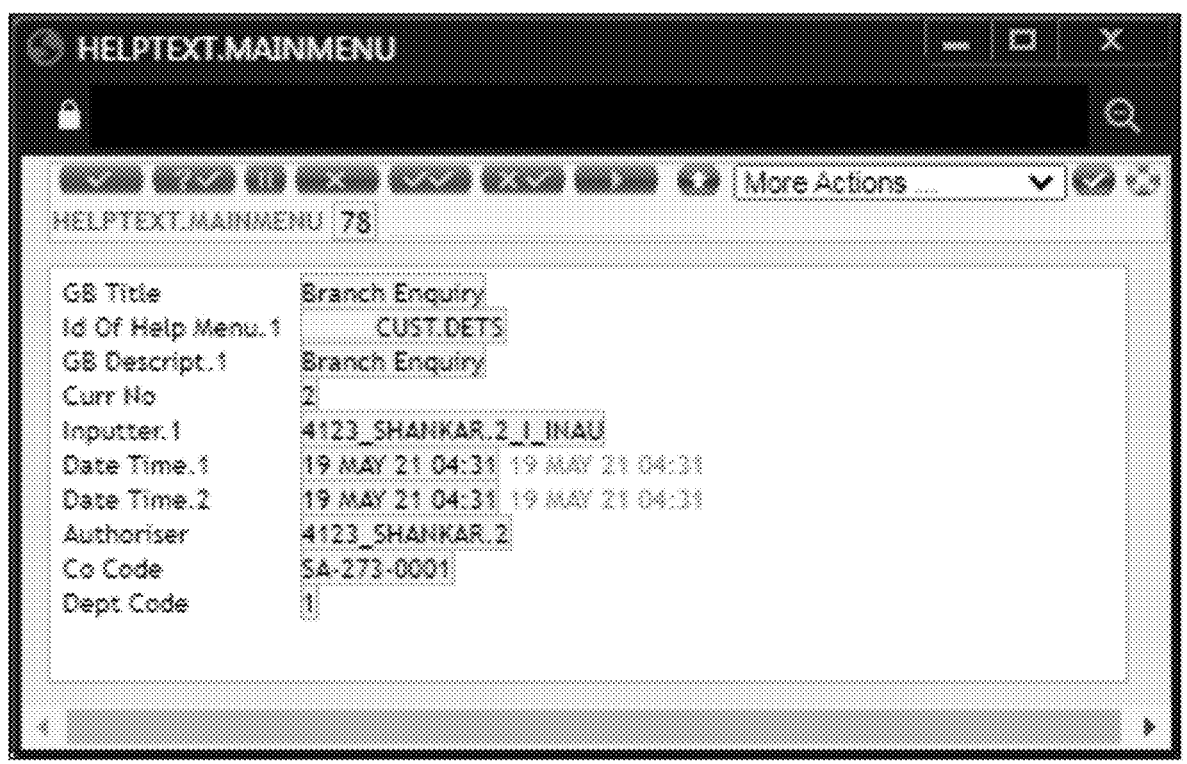
FIG. 5 is an example screenshot of configuration information associated with a main menu, according to some implementations.

FIG. 5 is an example screenshot 500 of configuration information associated with a main menu, according to some implementations. The main menu in this example is also referred to as "Branch Enquire" menu. The configurations when deployed into a target instance (e.g., test instance, etc.) makes the screen accessible to an end user (e.g., branch user). With regard to FIGS. 4 and 5, a development team may create a configuration that will attach the customer details to a menu.

Figure 6:
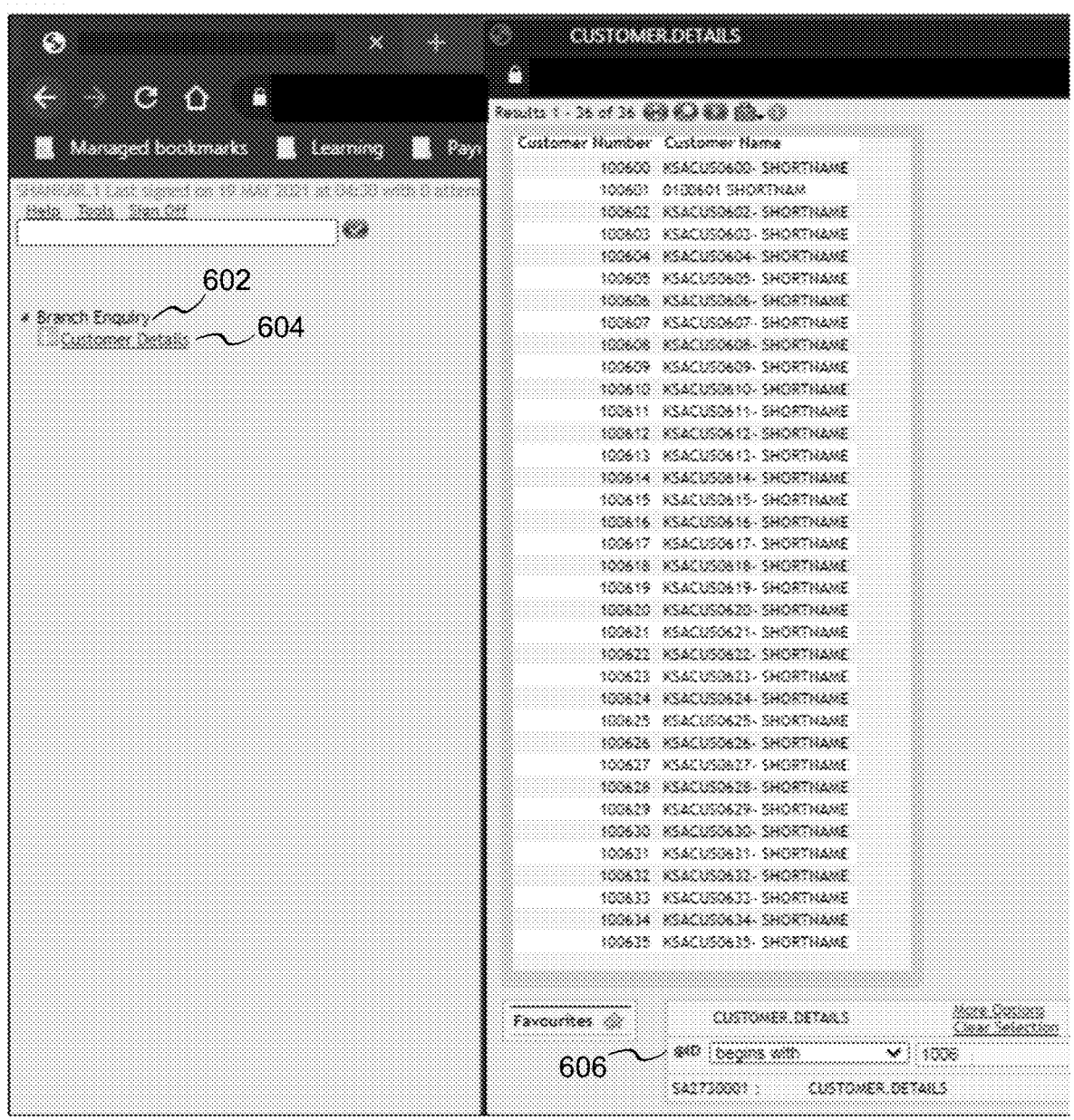
FIG. 6 is an example screenshot of selected customer information, according to some implementations.

FIG. 6 is an example screenshot 600 of selected customer information, according to some implementations. In some implementations, the user performs a login at the frontend.

The user may expand the menu link 602 (labeled "Branch Enquiry") to shown a link 604 (labeled "Customer Details"). Upon clicking "Customer Details," a dialog box 606 opens and prompts for input. The user may then enter criteria to select the customers (e.g., customers with customer id begins with 100600, etc.). This results in a list of customers matching the criteria, as shown. In various implementations, a branch user uses the menu and launches the screen that displays the customer details.

FIG. 7 is an example configuration as code (CaC) 700, according to some implementations. Here, the system has create all of the CaCs.

FIG. 8 is an example deployment as code (DaC) 800, according to some implementations. Here, the system has create all of the DaCs. As shown, the DaC lists CaCs to be deployed. In this example, the DaC includes ENQUIRY>CUSTOMER.DETAILS, HELPTEXT.MENU>CUST.DETS, AND HELPTEXT.MAIN-MENU>78, which are to be performed in this order.

FIG. 9 is an example configuration package 900, according to some implementations. In various implementations, configuration package 900 includes various CaCs and a DaC in one or more subpackages. In some implementations, the system pushes the CaCs and DaC into an appropriate feature branch in artifacts repository 108, creates a pull request for review, and then merges the CaCs and DaC into master repository 106.

In various implementations, the system prepares a configuration package using the CaCs and the DaC. The build may be either auto-scheduled or triggered depending on the particular implementation. In some implementations, the system selects the DaC, reads its contents, and creates a sub-package of all the relevant CaCs. The system repeats this process with all DaCs available and creates a cumulative configuration package as shown in FIG. 9.

The system uploads this configuration package gets uploaded into artifacts repository 108. Subsequently, the system deploys the configuration package into the target instance (e.g., test instance, etc.). Deployment may be either auto-scheduled or triggered, depending on the particular implementation.

In various implementations, deployment server 110 of the system downloads the latest package from artifacts repository 108 for deployment. Deployment server 110 of the system unpacks the downloaded package and reads the DaC file (e.g., the files with the extension ".dac"). Referring to the content in the DaC file, deployment server 110 of the system reads the content of the relevant CaC file(s) (e.g., the files with the extension ".cac,") and deploys these configurations into the target instance. This process is repeated for all DaCs files. Upon completion of deployment, deployment server 110 of the system then sends out a communication with the outcome to the targeted group.

Implementations described herein provide various benefits. For example, implementations provide continuous deployment and effective pipelines. Implementations are automatic in that they require no human intervention. Implementations store configuration packages in an accessible repository or repositories in a form that achieves readability and traceability, as well as visibility of changes in configurations for review. Implementations also provide common versioning for code together with data and configuration components.

Figure 10:
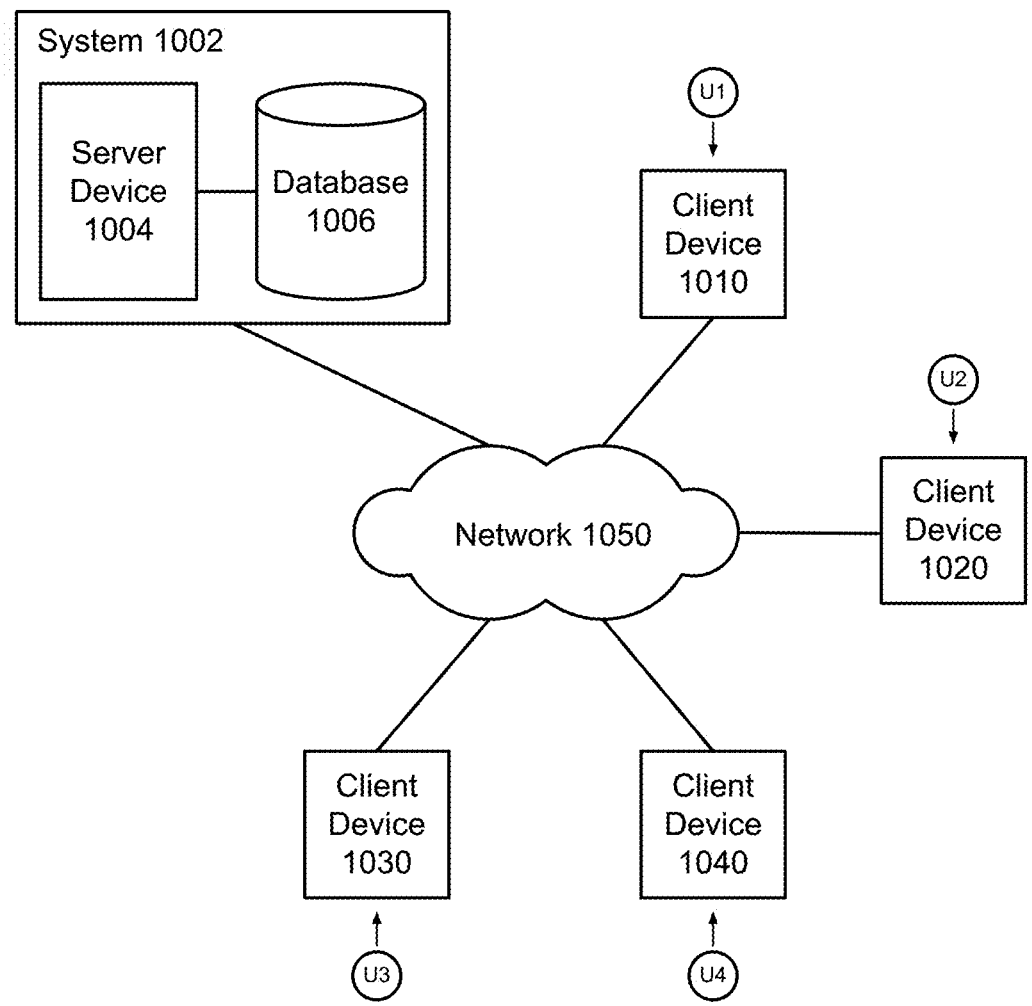
FIG. 10 is a block diagram of an example network environment, which may be used for some implementations described herein.

FIG. 10 is a block diagram of an example network environment 1000, which may be used for some implementations described herein. In some implementations, network environment 1000 includes a system 1002, which includes a server device 1004 and a database 1006. For example, system 1002 may be used to implement system 102 of FIG. 1, as well as to perform implementations described herein. Network environment 1000 also includes client devices 1010, 1020, 1030, and 1040, which may communicate with system 1002 and/or may communicate with each other directly or via system 1002. Network environment 1000 also includes a network 1050 through which system 1002 and client devices 1010, 1020, 1030, and 1040 communicate. Network 1050 may be any suitable communication network such as a Wi-Fi network, Bluetooth network, the Internet, etc.

For ease of illustration, FIG. 10 shows one block for each of system 1002, server device 1004, and network database 1006, and shows four blocks for client devices 1010, 1020, 1030, and 1040. Blocks 1002, 1004, and 1006 may represent multiple systems, server devices, and network databases. Also, there may be any number of client devices. In other implementations, environment 1000 may not have all of the components shown and/or may have other elements including other types of elements instead of, or in addition to, those shown herein.

While server device 1004 of system 1002 performs implementations described herein, in other implementations, any suitable component or combination of components associated with system 1002 or any suitable processor or processors associated with system 1002 may facilitate performing the implementations described herein.

In the various implementations described herein, a processor of system 1002 and/or a processor of any client device 1010, 1020, 1030, and 1040 cause the elements described herein (e.g., information, etc.) to be displayed in a user interface on one or more display screens.

Figure 11:
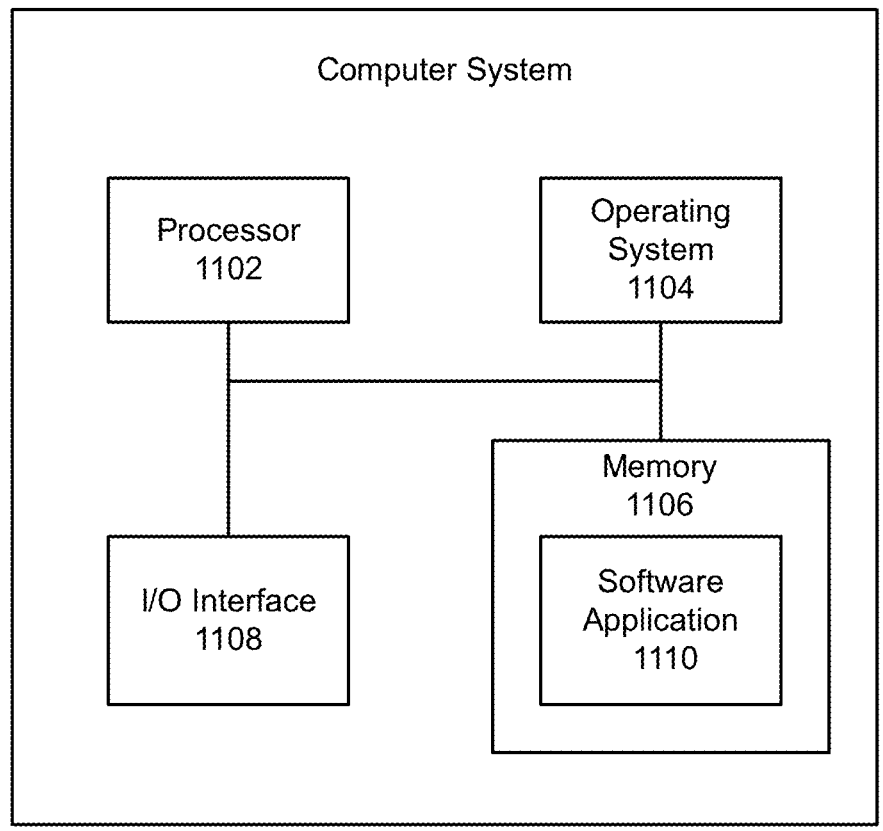
FIG. 11 is a block diagram of an example computer system, which may be used for implementations described herein.

FIG. 11 is a block diagram of an example computer system 1100, which may be used for some implementations described herein. For example, computer system 1100 may be used to implement server device 1004 of FIG. 4 and/or system 102 of FIG. 1, as well as to perform implementations described herein. In some implementations, computer system 1100 may include a processor 1102, an operating system 1104, a memory 1106, and an input/output (I/O) interface 1108. In various implementations, processor 1102 may be used to implement various functions and features described herein, as well as to perform the method implementations described herein. While processor 1102 is described as performing implementations described herein, any suitable component or combination of components of computer system 1100 or any suitable processor or processors associated with computer system 1100 or any suitable system may perform the steps described. Implementations described herein may be carried out on a user device, on a server, or a combination of both.

Computer system 1100 also includes a software application 1110, which may be stored on memory 1106 or on any other suitable storage location or computer-readable medium. Software application 1110 provides instructions that enable processor 1102 to perform the implementations described herein and other functions. Software application 1110 may also include an engine such as a network engine for performing various functions associated with one or more networks and network communications. The components of computer system 1100 may be implemented by one or more processors or any combination of hardware devices, as well as any combination of hardware, software, firmware, etc.

For ease of illustration, FIG. 11 shows one block for each of processor 1102, operating system 1104, memory 1106, I/O interface 1108, and software application 1110. These blocks 1102, 1104, 1106, 1108, and 1110 may represent multiple processors, operating systems, memories, I/O interfaces, and software applications. In various implementations, computer system 1100 may not have all of the components shown and/or may have other elements including other types of components instead of, or in addition to, those shown herein.

Although the description has been described with respect to particular implementations thereof, these particular implementations are merely illustrative, and not restrictive. Concepts illustrated in the examples may be applied to other examples and implementations.

In various implementations, software is encoded in one or more non-transitory computer-readable media for execution by one or more processors. The software when executed by one or more processors is operable to perform the implementations described herein and other functions.

Any suitable programming language can be used to implement the routines of particular implementations including C, C++, C#, Java, JavaScript, assembly language, etc. Different programming techniques can be employed such as procedural or object oriented. The routines can execute on a single processing device or multiple processors. Although the steps, operations, or computations may be presented in a specific order, this order may be changed in different particular implementations. In some particular implementations, multiple steps shown as sequential in this specification can be performed at the same time.

Particular implementations may be implemented in a non-transitory computer-readable storage medium (also referred to as a machine-readable storage medium) for use by or in connection with the instruction execution system, apparatus, or device. Particular implementations can be implemented in the form of control logic in software or hardware or a combination of both. The control logic when executed by one or more processors is operable to perform the implementations described herein and other functions. For example, a tangible medium such as a hardware storage device can be used to store the control logic, which can include executable instructions.

Particular implementations may be implemented by using a programmable general purpose digital computer, and/or by using application specific integrated circuits, programmable logic devices, field programmable gate arrays, optical, chemical, biological, quantum or nanoengineered systems, components and mechanisms. In general, the functions of particular implementations can be achieved by any means as is known in the art. Distributed, networked systems, components, and/or circuits can be used. Communication, or transfer, of data may be wired, wireless, or by any other means.

A "processor" may include any suitable hardware and/or software system, mechanism, or component that processes data, signals or other information. A processor may include a system with a general-purpose central processing unit, multiple processing units, dedicated circuitry for achieving functionality, or other systems. Processing need not be limited to a geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with the memory. The memory may be any suitable data storage, memory and/or non-transitory computer-readable storage medium, including electronic storage devices such as random-access memory (RAM), read-only memory (ROM), magnetic storage device (hard disk drive or the like), flash, optical storage device (CD, DVD or the like), magnetic or optical disk, or other tangible media suitable for storing instructions (e.g., program or software instructions) for execution by the processor. For example, a tangible medium such as a hardware storage device can be used to store the control logic, which can include executable instructions. The instructions can also be contained in, and provided as, an electronic signal, for example in the form of software as a service (SaaS) delivered from a server (e.g., a distributed system and/or a cloud computing system).

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular implementations have been described herein, latitudes of modification, various changes, and substitutions are intended in the foregoing disclosures, and it will be appreciated that in some instances some features of particular implementations will be employed without a corresponding use of other features without departing from the scope and spirit as set forth. Therefore, many modifications may be made to adapt a particular situation or material to the essential scope and spirit.

What is claimed is:

1. A system comprising:
one or more processors; and
logic encoded in one or more non-transitory computer-readable storage media for execution by the one or more processors and when executed operable to cause the one or more processors to perform operations comprising:
extracting configuration information and deployment information from a database;
extracting one or more configuration components from the configuration information, wherein the one or more configuration components comprise functionality at a database layer, wherein the one or more configuration components comprise one or more of user interface screen design and system properties, and wherein the one or more configuration components are stored in a file;
storing the configuration information and the deployment information in a file having a predetermined computer-readable format, wherein the file that stores the configuration information is computer-traceable;
storing the file that stores the configuration information in a source code repository, and wherein the configuration information comprises configuration changes that are performed on the database;
generating a unique name for the file that stores the configuration information;
computing a deployment sequence based on the deployment information;
adding the deployment sequence to the configuration package;

generating a configuration package based on the configuration information and the deployment information, wherein the configuration package includes the configuration information and the deployment information, wherein the configuration package indicates one or more changes to the configuration information, and wherein the one or more changes to the configuration information comprise one or more functional changes at the database layer; and deploying the configuration package.

2. The system of claim 1, wherein the unique name has a semantic meaning.

3. The system of claim 1, wherein the one or more changes to the configuration information comprise one or more of changes to screen design files and changes to system property files.

4. The system of claim 1, wherein the logic when executed is further operable to cause the one or more processors to perform operations comprising sending deployment results to a target group.

5. A non-transitory computer-readable storage medium with program instructions stored thereon, the program instructions when executed by one or more processors are operable to cause the one or more processors to perform operations comprising:

extracting configuration information and deployment information from a database;

extracting one or more configuration components from the configuration information, wherein the one or more configuration components comprise functionality at a database layer, wherein the one or more configuration components comprise one or more of user interface screen design and system properties, and wherein the one or more configuration components are stored in a file;

storing the configuration information and the deployment information in a file having a predetermined computer-readable format, wherein the file that stores the configuration information is computer-traceable;

storing the file that stores the configuration information in a source code repository, and wherein the configuration information comprises configuration changes that are performed on the database;

generating a unique name for the file that stores the configuration information;

computing a deployment sequence based on the deployment information;

adding the deployment sequence to the configuration package;

generating a configuration package based on the configuration information and the deployment information, wherein the configuration package includes the configuration information and the deployment information, wherein the configuration package indicates one or more changes to the configuration information, and wherein the one or more changes to the configuration information comprise one or more functional changes at the database layer; and deploying the configuration package.

6. The computer-readable storage medium of claim 5, wherein the unique name has a semantic meaning.

7. The computer-readable storage medium of claim 5, wherein the one or more changes to the configuration information comprise one or more of changes to screen design files and changes to system property files.

8. The computer-readable storage medium of claim 5, wherein the instructions when executed are further operable to cause the one or more processors to perform operations comprising sending deployment results to a target group.

9. A computer-implemented method comprising:

extracting configuration information and deployment information from a database;

extracting one or more configuration components from the configuration information, wherein the one or more configuration components comprise functionality at a database layer, wherein the one or more configuration components comprise one or more of user interface screen design and system properties, and wherein the one or more configuration components are stored in a file;

storing the configuration information and the deployment information in a file having a predetermined computer-readable format, wherein the file that stores the configuration information is computer-traceable;

storing the file that stores the configuration information in a source code repository, and wherein the configuration information comprises configuration changes that are performed on the database;

generating a unique name for the file that stores the configuration information;

computing a deployment sequence based on the deployment information;

adding the deployment sequence to the configuration package;

generating a configuration package based on the configuration information and the deployment information, wherein the configuration package includes the configuration information and the deployment information, wherein the configuration package indicates one or more changes to the configuration information, and wherein the one or more changes to the configuration information comprise one or more functional changes at the database layer; and deploying the configuration package.

10. The method of claim 9, wherein the unique name has a semantic meaning.

11. The method of claim 9, wherein the one or more changes to the configuration information comprise one or more of changes to screen design files and changes to system property files.

* * * * *